United States Patent
Yoshiya et al.

(10) Patent No.: US 7,136,970 B2
(45) Date of Patent: Nov. 14, 2006

(54) STORAGE SYSTEM AND DYNAMIC LOAD MANAGEMENT METHOD THEREOF

(75) Inventors: Yukihiro Yoshiya, Kawasaki (JP); Yuji Noda, Kahoku (JP); Keiichi Umezawa, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 10/740,443

(22) Filed: Dec. 22, 2003

(65) Prior Publication Data

US 2004/0133707 A1    Jul. 8, 2004

(30) Foreign Application Priority Data

Dec. 26, 2002    (JP)    ............... 2002-377977

(51) Int. Cl.
*G06F 12/00*    (2006.01)
*G06F 9/50*    (2006.01)

(52) U.S. Cl. .............. 711/152; 711/153; 709/225; 709/226; 718/105

(58) Field of Classification Search ............... None
See application file for complete search history.

(56) References Cited

U.S. PATENT DOCUMENTS

| | | | |
|---|---|---|---|
| 6,456,850 B1 * | 9/2002 | Kim et al. ............... | 455/453 |
| 6,493,811 B1 * | 12/2002 | Blades et al. ............. | 711/203 |
| 6,947,985 B1 * | 9/2005 | Hegli et al. .............. | 709/224 |

FOREIGN PATENT DOCUMENTS

JP    9-258907    10/1997

* cited by examiner

*Primary Examiner*—T Nguyen
(74) *Attorney, Agent, or Firm*—Westerman, Hattori, Daniels & Adrian, LLP.

(57) ABSTRACT

A storage system accesses a storage device according to the host I/O request and internal I/O request for preventing a time out error of the host I/O due to a stagnation of command processing. The command processing section performs system load management, where the host I/O requests which are not managed by the storage system are managed according to the system load of the storage system, and for the host I/O requests which exceed the system load, the host I/O request is not processed but an error is replied, and the host retries the command to suppress the stagnation of command processing in the system.

20 Claims, 13 Drawing Sheets

| EACH DISK | | 76-1 | |
|---|---|---|---|
| HARDWARE CAPABILITY LIMITED POINTS | TOTAL POINTS (ACTUAL LOAD) | IN-EXECUTION POINTS | WAIT POINTS |
| LIMITED NUMBER OF COMMAND | TOTAL NUMBER OF COMMAND | THE NUMBER OF IN EXECUTION COMMAND | THE NUMBER OF WAITING COMMAND |

⋮

PRIOR ART

STORAGE SYSTEM AND DYNAMIC LOAD MANAGEMENT METHOD THEREOF

CROSS-REFERENCE TO RELATED APPLICATIONS

This application is based upon and claims the benefit of priority from the prior Japanese Patent Application No. 2002-377977, filed on Dec. 26, 2002, the entire contents of which are incorporated herein by reference.

BACKGROUND OF THE INVENTION

1. Field of the Invention

The present invention relates to a storage system which inputs/outputs data using such a storage device as a magnetic disk, and dynamic load management method thereof, and more particularly to a storage system for preventing the stagnation of command processing by managing the processing amount of input/output commands and dynamic load management method thereof.

2. Description of the Related Art

In a storage device using such a storage medium as a magnetic disk, magneto-optical disk and optical disk, the storage medium is actually accessed by the request of a data processing apparatus. When the data processing apparatus uses large capacity data, a storage system comprising a plurality of storage device and a control device is used.

Such a storage system has a DTC (Dynamic Traffic Control) function which dynamically optimizes resource allocation in the system for a large volume of access, so as to implement stable performance for the access from the host device. FIG. 19 is a block diagram of a prior art, and FIG. 20 is a diagram describing the prior art.

As FIG. 19 shows, the storage controller 100 controls access to a plurality of storage devices (magnetic disk devices) 110 according to the host I/O commands. This storage controller 100 has a command processing function 102, DTC function 104, disk driver 106 and device adaptor 108. The command processing function 102 receives the host I/O command and the internal I/O command.

The internal I/O command is a command for I/O control which is executed in the background of the host I/O, and examples are OPC (One Point Copy), which-sequentially copies in the background of the host I/O according to the copy instruction of the continuous block group of the host, rebuilding RAID, and copy back for data backup.

The DTC function 104 controls the number of commands to be issued to the storage device 110 via the driver 106 and the device adaptor 108. As FIG. 20 shows, according to the prior art, the DTC function 104 measures the response time of each command (time from when the command is issued to the storage device 110 to when the response is received from the storage device 110), calculates the average of the response time, and increases the number of issued commands in unit time if this average response time is quicker than a predetermined time, or decreases the number of issued commands in unit time if the average response time is slower than a predetermined time. The commands exceeding the determined number of issued commands are held in a queue.

The command processing function 102 processes the host I/O (random, sequential) with priority, without restrictions in acceptance, and transfers it to the DTC 104. The internal I/O is processed in the background of the host I/O, and is transferred to the DTC 104. The DTC 104 issues the number of commands, which does not exceed a predetermined number of issued commands, to the storage device 110 via the driver 106 and the device adaptor 108.

In this way, the DTC 104 dynamically changes the number of startup (number of commands) according to the response time of the storage device 110, so as to optimize the execution of the I/O commands.

Since all host I/Os are accepted in the prior art, if host I/Os beyond system performance are accepted, the host I/Os cannot be executed within the internal time out time (e.g. 25 seconds), and a time out is replied to the host. Therefore the execution wait time of I/O request for host becomes long, and the host must issue the host I/O again according to the time out.

Also an internal I/O, such as OPC, may wait in the DTC 104 while having an exclusion right (called Extent exclusion) of the internal buffer area in the command processing section 102, and if this happens, the next host I/O command cannot acquire Extent exclusion and sleeps, and in the worse case an internal time out occurs.

Also the conventional DTC determines a new number of startup only by the response time from the storage device (disk device) in the past, so if a response from the disk device temporarily delays, an issue of a new command to the disk device is restricted more than necessary, which makes it difficult to fully use the performance of the storage device.

SUMMARY OF THE INVENTION

With the foregoing in view, it is an object of the present invention to provide a storage system for preventing a time out due to a processing delay of an accepted host I/O by adjusting the acceptance of the host I/O, and dynamic load management method thereof.

It is another object of the present invention to provide a storage system for inhibiting the accepting of command processing of the host I/O beyond system performance, and preventing a time out due to a processing delay of the accepted host I/O, and the dynamic load management method thereof.

It is still another object of the present invention to provide a storage system for preventing a time out due to a processing delay of the accepted host I/O without interrupting the host/IO processing by performing load management before Extent exclusion, and the dynamic load management method thereof.

It is still another object of the present invention to provide a storage system for inhibiting issuing commands to a storage device beyond hardware performance by performing flow management focusing on the storage device so as to fully use the performance of the storage device, and the dynamic load management method thereof.

To achieve these objects, the storage system of the present invention has a command processing unit for executing command processing according to an I/O request, and an access execution unit for accessing a storage device according to the processing result. And the command processing unit estimates a load of the requested I/O request on the access execution unit, manages the actual load of the access execution unit, calculates system load from the estimated load and the actual load, and inhibits the acceptance of the I/O request requested from the host when the system load exceeds a predetermined threshold.

The dynamic system load management method of the present invention has a command-processing step of executing command processing according to an I/O request, an access execution step of accessing a storage device according to the processing result, a system load calculation step of estimating the load of the access execution step of the requested I/O request, managing the actual load of the access execution step, and calculating the system load from the estimated load and the actual load, and a step of inhibiting the acceptance of the I/O request requested from the host when the system load exceeds a predetermined threshold.

Conventionally, a host I/O request was not managed, but in the present invention, when a host I/O request exceeds the system load of the storage system, the host I/O request is, not processed but an error is replied so that the host retries the command. This suppresses the stagnation of command processing in the system. Also the system load is calculated from both loads before and after access execution, so the load of the system itself can be accurately managed.

In the present invention, it is preferable that the command processing unit adjusts the host I/O request and the internal I/O request according to the system load, analyzes the adjusted I/O request, executes resource acquisition processing and starts up the access execution processing. By this, an I/O request can be adjusted before acquiring the internal resource, and the generation of a time out error can be prevented promptly without interrupting the processing of a host I/O.

In the present invention, it is preferable that the command processing unit has a first I/O control module for adjusting the host I/O request, and a second I/O control module for adjusting the internal I/O request, and when the system load exceeds a predetermined threshold, acceptance of the I/O request requested from the host is inhibited, and the internal I/O is queued.

Since the adjustment of the host I/O and the adjustment of the internal I/O are separated in this way, an internal I/O request can be executed promptly without interrupting a host I/O request.

Also in the present invention, it is preferable that the command processing unit estimates the processing time of the access execution unit including the storage device from the parameters of the I/O request so as to acquire the estimated load, and also calculates the processing time of the access execution unit including the storage device from the command processing result so as to acquire the actual load.

By this, the estimated load can be estimated in a stage where the hardware use amount in the access execution unit is uncertain.

Also in the present invention, it is preferable that the command processing unit prioritizes the host. I/O request and controls the ratio of the internal I/O processing with respect to the system load based on the system load. By this, an internal I/O request can be processed promptly.

Also in the present invention, it is preferable that the command processing unit controls the command processing amount of the access execution unit according to the actual load. By this, issuing commands beyond the hardware performance of the access execution unit can be inhibited, and a time out of the storage device can be prevented.

Also in the present invention, it is preferable that the command processing unit estimates the load from a unit processing time of the access execution unit which is defined by the hardware and the number of I/O requests which are processed. By this, the load can be estimated and accuracy becomes high.

Moreover, in the present invention, it is preferable that the system further has a cache memory for storing a part of the data of the storage device, and the command processing unit refers to the cache memory when the host I/O request is received, and inhibits the acceptance of the I/O request requested from the host when the system load exceeds a predetermined threshold for the host I/O which cannot be processed by the cache memory.

By removing an I/O request of a cache hit, a more accurate management of a host I/O request becomes possible.

Also in the present invention, it is preferable that the command processing unit further has a front module for referring to the cache memory and processing the host I/O request by the cache memory, an IO control module for inhibiting the acceptance of a host I/O request when the system load exceeds a predetermined threshold for the host I/O which cannot be processed by the cache memory and the internal I/O, and a back end module for analyzing the I/O request adjusted by the IO control module and acquiring the resource.

By this, a host I/O request can be easily managed in the flow of command processing.

Also in the present invention, it is preferable that the command processing unit has a flow estimate module for estimating the load of the requested I/O request on the access execution unit, an actual load management module for managing the actual load of the access execution unit, and a load statistic module for calculating the system load from the estimated load and the actual load. By this, the system load can be calculated quickly and easily.

DESCRIPTION OF THE PREFERRED EMBODIMENTS

Embodiments of the present invention will now be described in the sequence of the storage system, dynamic system load management configuration, system load management, dynamic system load control, threshold adjustment processing and other embodiments.

[Storage System]

Figure 1:
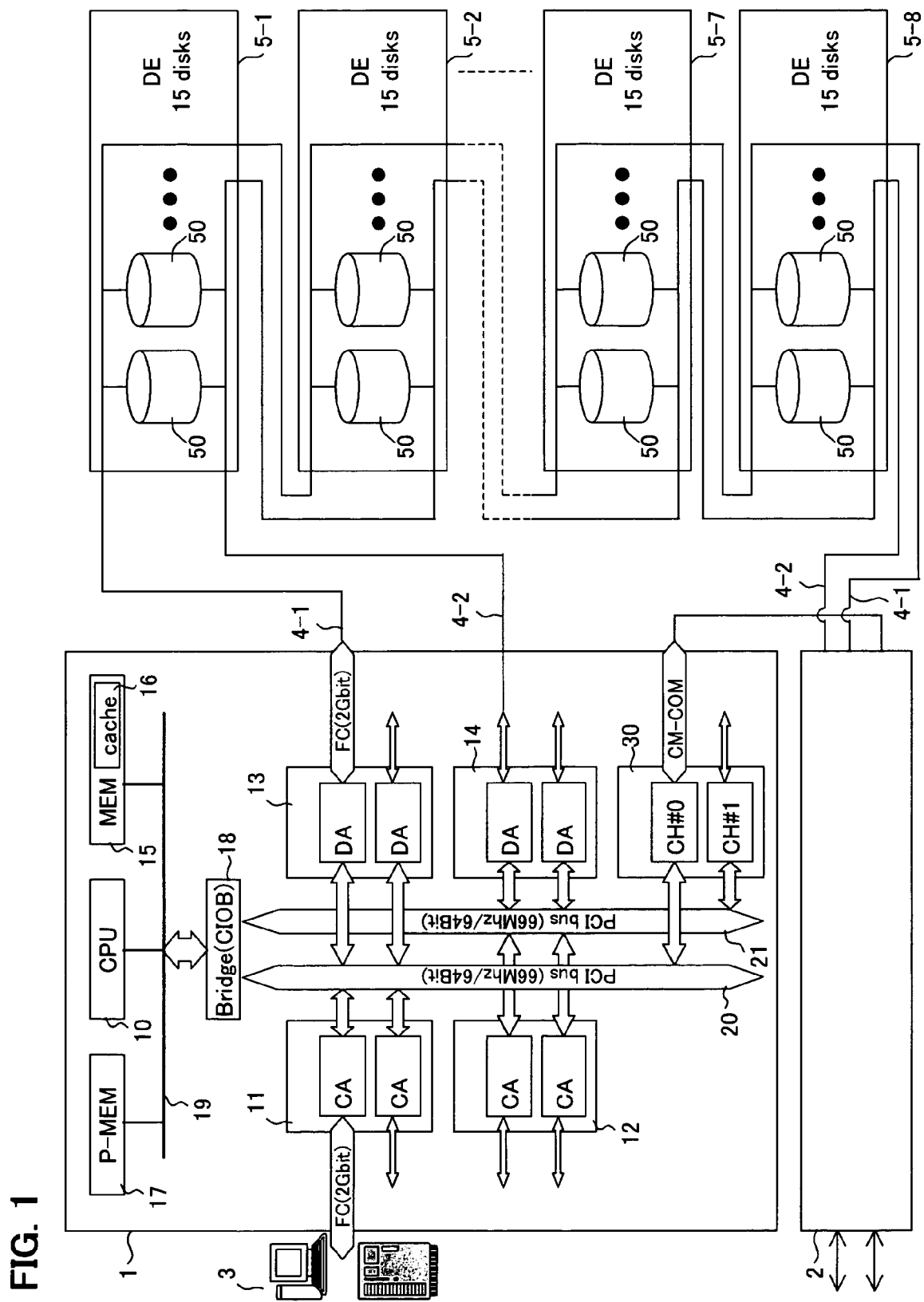
FIG. 1 is a block diagram depicting the storage system according to an embodiment of the present invention.

FIG. 1 is a block diagram depicting a storage system according to an embodiment of the present invention, and shows a RAID (Redundant Arrays of Inexpensive Disk) system using a magnetic disk. As FIG. 1 shows, the storage system has a pair of magnetic disk controllers (hereafter called controllers) 1 and 2, and many device enclosures 5-1 to 5-8 which are connected to the pair of controllers 1 and 2 via the FC_ALs (Fiber Channel Arbitrated Loop) 4-1 and 4-2.

Each one of these device enclosures 5-1 to 5-8 encloses 15 magnetic disk devices (storage devices) 50. Each magnetic disk device 50 is connected to a, pair of FC_ALs 4-1 and 4-2.

The controllers 1 and 2 are systems which are connected to the host 3, such as a client and server, directly or via network equipment for reading/writing a large volume of data of the host 3 from/to the RAID disk drive (magnetic disk device) at high-speed and at random.

The pair of controllers 1 and 2 has an identical configuration. Therefore the configuration of the controller 1 will be described here, and the description of the configuration of the controller 2 is omitted. The controller 1 has the function modules of CAs (Channel Adapters) 11, 12, CMs (Centralized Modules) 10, 15 to 19, and DAs (Device Adapters) 13, 14.

The CAs (Channel Adapters) 11 and 12 are circuits that control the host interface for connecting the host, and has a fiber channel circuit (FC) and DMA (Direct Memory Access) circuit, for example. The DAs (Device Adapters) 13 and 14 are circuits for exchanging commands and data with a disk device for controlling the disk device (magnetic disk device) 50, and has a fiber channel circuit (FC) and DMA circuit, for example.

The CM (Centralized Module) has a CPU 10, memory (RAM) 15, flash memory (program memory) 17, and IO bridge-circuit 18. The memory 15 is backed up by a battery, and a part of it is used as a cache memory 16.

The CPU 10 is connected to the memory 15, the flash memory 17 and the IO bridge circuit 18 via an internal bus 19. This memory 15 is used for the work area of the CPU 10, and the flash memory 17 stores programs which the CPU 10 executes. For these programs, the kernel, BIOS (Basic Input/Output System), file access programs (read/write programs), and RAID management programs, for example, are stored. The CPU 10 executes these programs to execute read/write processing and RAID management processing.

A pair of PCI (Peripheral Component Interface) buses 20 and 21 connect the CAs 11 and 12 and the DAs 13 and 14, and also connect the CPU 10 and the memory 15 via the IO bridge circuit 18. Also the PCI-node link bridge circuit 30 is connected to the PCI buses 20 and 21.

The PCI-node link bridge circuit 30 of the controller 1 is connected to the PCI-node link bridge circuit of the controller 2 for communication of commands and data between the controllers 1 and 2.

For example, the controller 1 is in-charge of the disk devices 50 of the device enclosures 5-1 to 5-4, and the controller 2 is in-charge of the disk devices 50 of the device enclosures 5-5 to 5-8. In FIG. 1, the disk devices 50 of the device enclosures 5-1 to 5-4 and the disk devices 50 of the device enclosures 5-5 to 5-8 have the configuration of the RAID 5.

The cache memory 16 stores a part of the data of the disk device in which the cache memory 16 is in-charge of respectively, and stores the write data from the host. The CPU 10 receives the read request from the host via-the CAs 11 and 12, and judges whether access to the physical disk is necessary by referring to the cache memory 16, and requests the disk access request to the DAs 13 and 14 if necessary.

The CPU 10 receives a write request from the host, writes the write data to the cache memory 16, and requests the write back, which is internally scheduled, to the DAs 13 and 14.

[Dynamic System Load Management Configuration]

Figure 2:
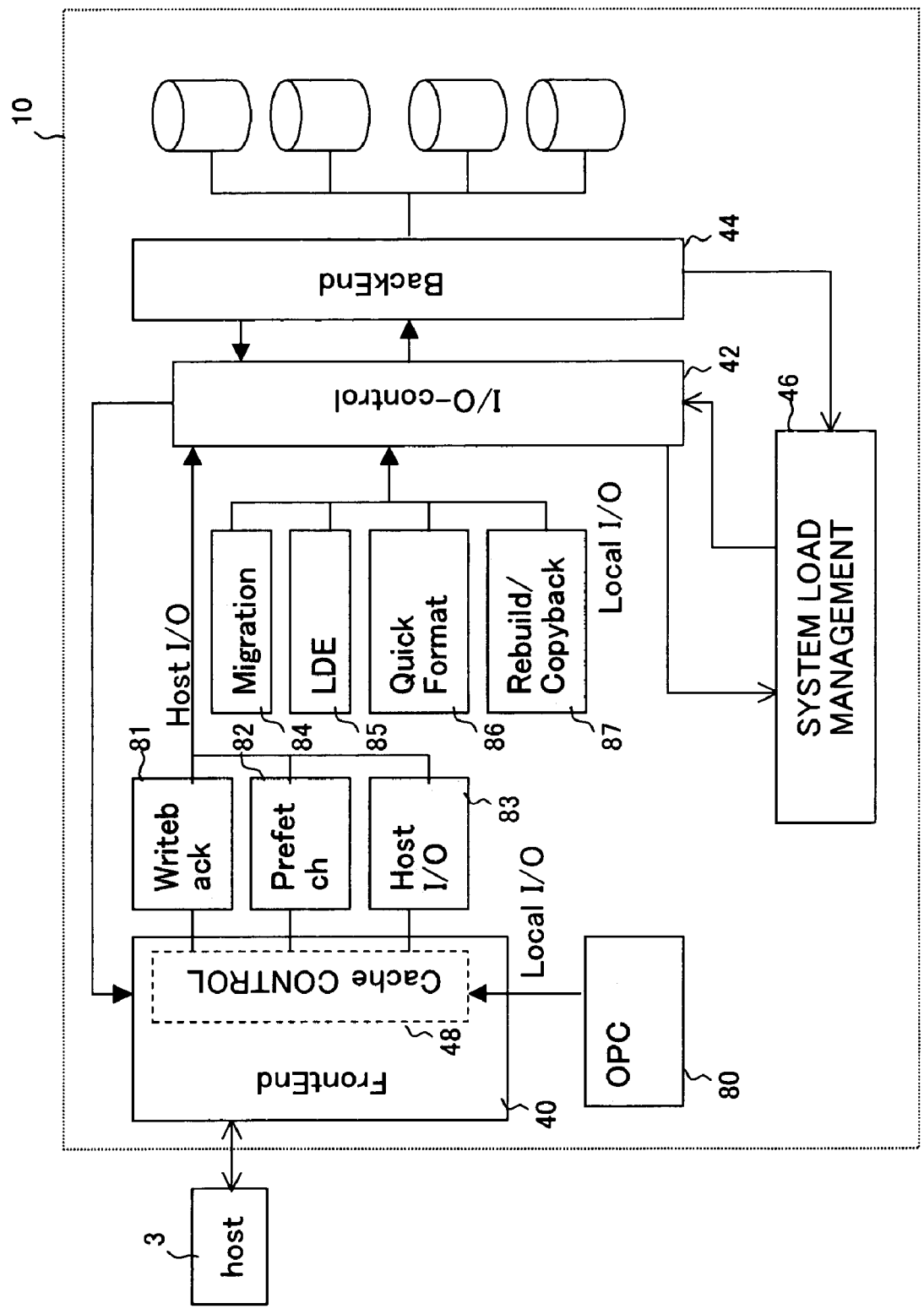
FIG. 2 is a block diagram depicting the command processing section according to an embodiment of the present invention.
Figure 3:
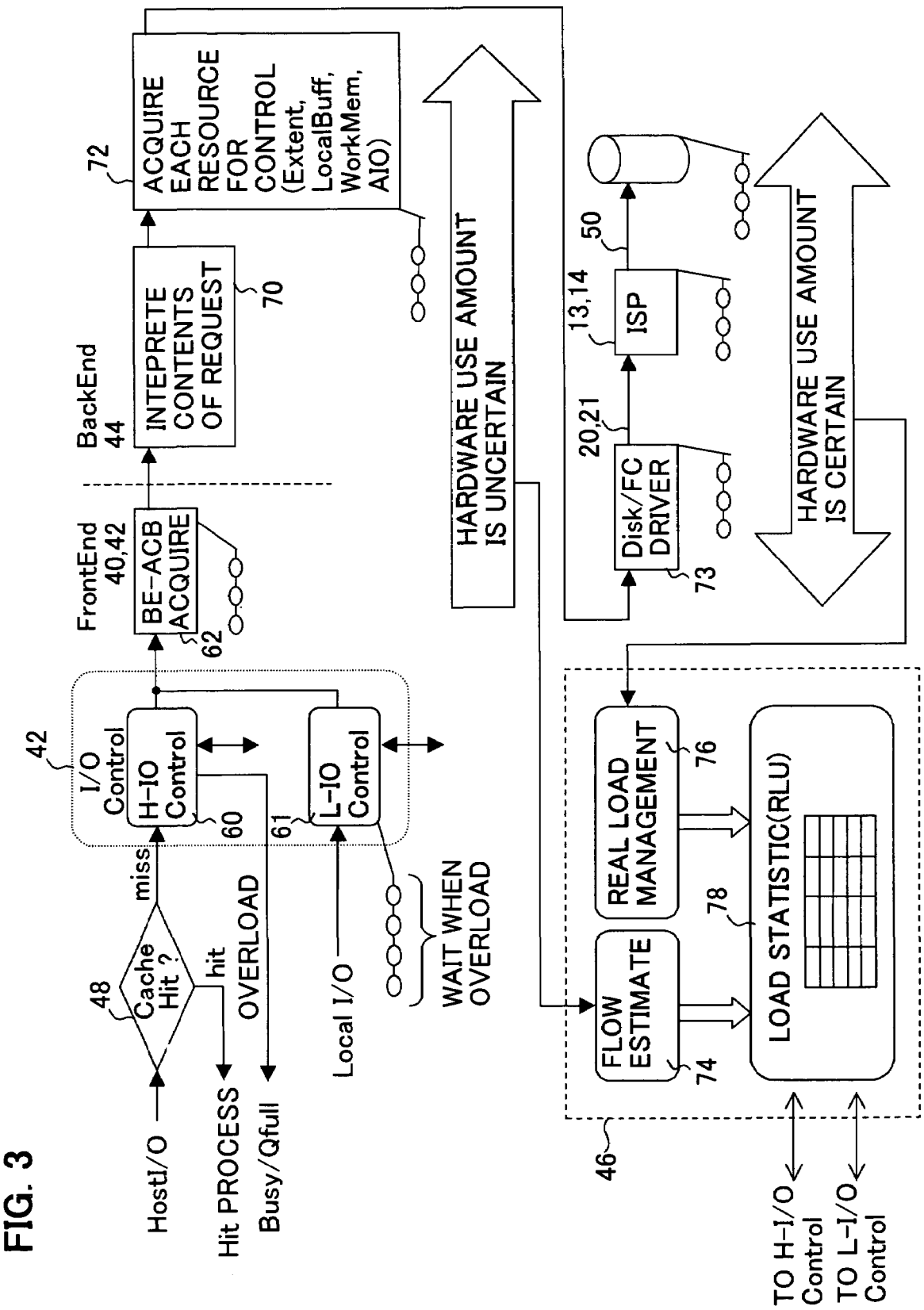
FIG. 3 is a detailed block diagram depicting the command processing section according to the embodiment of the present invention in FIG. 2.

FIG. 2 is a diagram depicting the relationship between the IO command processing module, which the CPU 10 in FIG. 1 executes, and the load, and FIG. 3 is a block diagram depicting the IO command processing module in FIG. 2.

As FIG. 2 shows, the IO command processing module has a front end processing module 40, for judging whether access to the storage device is necessary, a back end processing module 44, for processing access to the storage device, and an I/O control module 42, for controlling the acceptance amount of IO commands to the back end processing module 44. The front end processing module 40 has a cache control module 48 for referring to the cache memory 16 (see FIG. 1), and reading and writing the data from/to the cash memory 16.

The load on the back end processing module 44 is due to the host I/O and the internal (local) I/O. I/O commands from the host 3 are: a command for write back 81 (write back from the cache) after executing the write command, a command for pre-fetch 82 (pre-staging the peripheral data of the data which was read), and a host I/O command 83.

The internal commands (local commands) are: a command for one point copy 80 which copies data sequentially according to the copy instructions from the host, a command for migration 84 for changing the RAID level according to external instructions, a command for LDE (Logical Device Expansion) 85 for expanding the capacity by adding disk devices, a command for quick format 86 for formatting the physical disk in the background, and a command for a rebuilding and copy back 87.

In this embodiment, the system load management module 46, which calculates the system load based on the information from the I/O control module 42 and the information from the back end module 44, for controlling the I/O control module 42, is disposed. This will be described in detail with reference to FIG. 3.

As FIG. 3 shows, the I/O control module 42 has a host-IO (H-IO) control module 60 and local IO (L-IO) control module 61.

The host-IO control module 60 is a module for adjusting the acceptance amount of the host I/Os. The host-IO control module 60 is called after a miss-hit (target data does not exist in the cache memory 16) is judged by the cache control module 48 of the front end module 40, judges the system load status of the system load management module 46, and adjusts the acceptance amount of the host I/Os. The acceptance amount is adjusted by a Busy/Q(Queue)—Full response to the host 3.

The local IO control module 61 is a module for adjusting the activation amount of local I/Os. At the point when a local I/O is accepted, the local IO control module 61 judges the load status of the system load management module 46 and adjusts the activation amount. The activation amount is adjusted by queuing.

In the I/O control module 42, BE (Back End)-ACB (Access Control Block) is acquired for the I/O command for which activation is permitted via the BE-ACB acquisition processing 62, and access to the back end module 44 is enabled. In the back end module 44, interpretation processing 70 of the request content of the I/O command is performed, and each resource acquisition processing 72 for control is executed according to this interpretation (command division to the disks). In the resource acquisition processing 72, the internal buffer area (Extent), local buffer, and work memory are acquired, and the exclusion right is set.

After acquiring the resources, a disk command is issued to the Disk/FC (Fiber Channel) driver 73. The disk command is sent from the driver 73 to the DA 13 (14) via the PCI bus 20 (21), and the disk command is also transferred to the magnetic disk device 50 via the FC_AL 4-1 (4-2). By this, the magnetic disk device 50 executes this disk command.

On the other hand, the system load management module 46 has a flow estimate module 74, actual load management module 76 and load statistic module 78. The flow estimate module 74 estimates the hardware use amount in a stage where the hardware use amount is uncertain. In other words, the flow estimate module 74 calculates a unique point (estimate value of hardware use amount) by using each parameter (e.g. number of times of transfer/read/write/RAID level) of an I/O request when an I/O is requested to the back end module 44, and reflects the information (estimate value) to the load statistic module 78.

The actual load management module 76 calculates the hardware use amount (actual load) when the hardware use amount is defined. In other words, the actual load management module 76 manages the activated transfer amount to the disk device 50/FC_AL 4-1(hardware), and adjusts activation so that a time out of hardware does not occur. Also the actual load management module 76 calculates the actual load information of the hardware and reflects it to the load statistic module 78.

The load statistic module 78 compiles the statistics of the load in RLU (Raid Logical Unit) units, and notifies inhibition to the H-IO/L-IO control modules 60 and 61 when overload status occurs.

Figure 4:
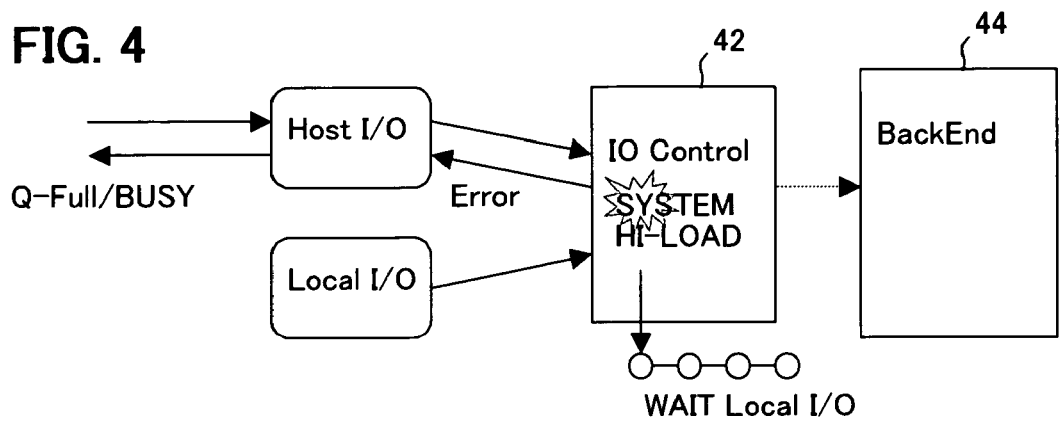
FIG. 4 is a diagram depicting the operation of the IO control section in FIG. 2.
Figure 5:
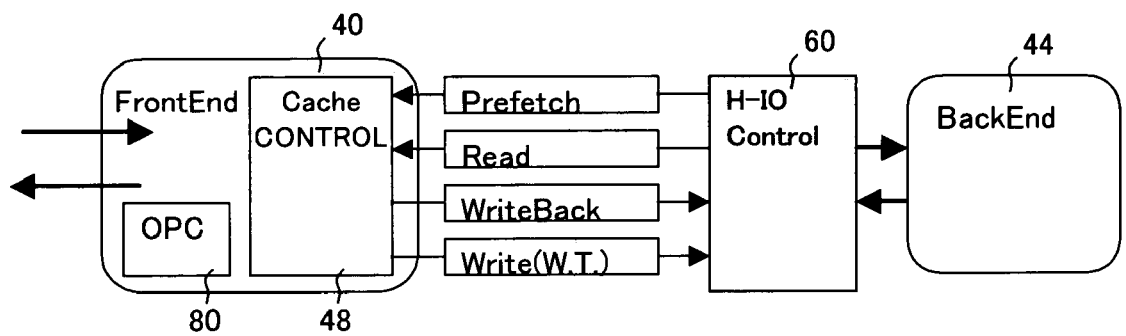
FIG. 5 is a diagram depicting the operation when the load of the H-IO control section in FIG. 4 is low.
Figure 6:
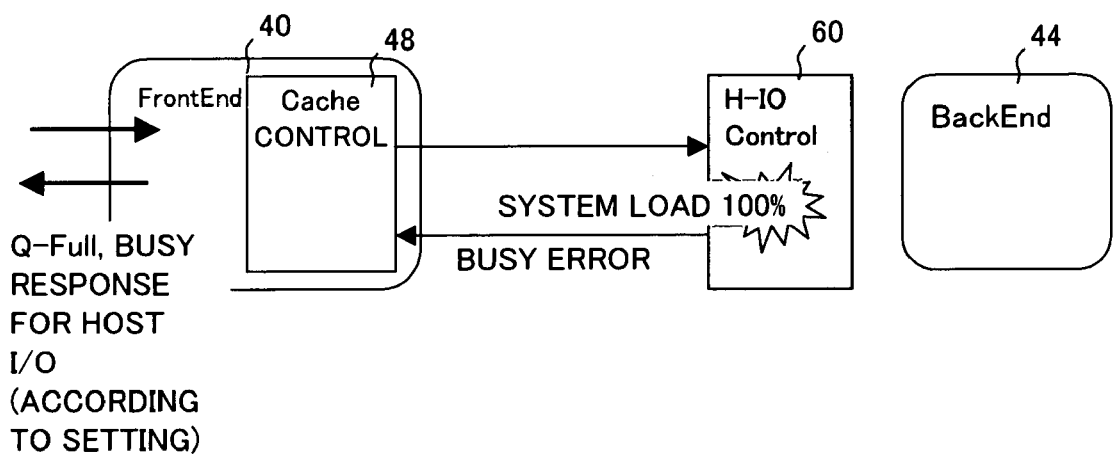
FIG. 6 is a diagram depicting the operation when the load of the H-IO control section in FIG. 4 is high.

FIG. 4 to FIG. 6 are diagrams depicting the operation of the system load management.

As FIG. 4 shows, the upper limit of the command size, which can be issued to the back end module 44, is determined by the flow management of the back end of the system load management module 46. The IO control module 42 limits the commands to be issued so that data exceeding this upper limit is not issued to the back end module 44. The IO control module 42 is comprised of the H-IO control module 60, for controlling the host I/Os, and the L-IO module 61, for controlling the local I/Os, as mentioned above.

The IO control module 42, which accepted the I/O request, checks the upper limit (threshold) of the command size that can be issued,, and if the command size is less than the threshold, the command is immediately issued to the back end module 44, but if more than the threshold, issuing the command is inhibited until the previously issued command is completed and the command size in-execution in the back end module 44 becomes less than the threshold.

As the inhibition method, an error is returned to the command issued source in the case of a host I/O. The front end module 40, which received the error, returns Q(Queue)-full/BUSY (depending on the setting) to the host 3. In the case of a local I/O, the command is held in the queue in the L-IO control module 61, and waits. In this case, the command is re-executed when the threshold is checked again at the completion of execution of the previous command (when returned from the back end module 44).

As FIG. 5 shows, for a host I/O, cache hit data is not restricted but is immediately executed when the host I/O is accepted. For the cache miss-hit data and write back data, the H-IO control module 60 is called up as write back data, and the possibility of a command entry to the back end module 44 is inquired. For pre-fetch and read data as well, the H-IO control module 60 is called up.

When the system load exceeds 100%, as shown in FIG. 6, on the other hand, the H-IO control module 60 returns a BUSY error to the cash control module when the cache control module 48 inquires to the H-IO control module 60. The cache control module 48 performs abnormality processing, such as returning an error to the host and the queuing of a write back, because of the BUSY error.

In this way, command processing exceeding the system performance is not accepted by managing the host I/Os according to the system load. Also by performing load management before Extent exclusion, host I/O processing is not interrupted.

Also flow management is performed focusing on the disk device, and the issuing of disk commands exceeding hardware performance is inhibited. By managing the system load linking with internal timer monitoring, an internal time out (path disconnection) is prevented from occurring frequently.

In other words, by comprehensively managing the estimate calculation of the weight of the load for each individual host I/O and local I/O and the actual load of the hardware, the load of the entire system can be known in real-time, system performance can be expressed to the full, and accurate load management can be implemented.

Other than these shortcomings, the advantages of DTC are used continuously. In other words, the local I/Os are more restricted so that host I/O processing is not interrupted very much. The number of internal I/Os (commands to the disk device) to be issued is dynamically restricted depending on the system load status. Also for OPC and Rebuilt/Copyback, load management is performed separately considering the difference in control.

[System Load Management]

Figure 7:
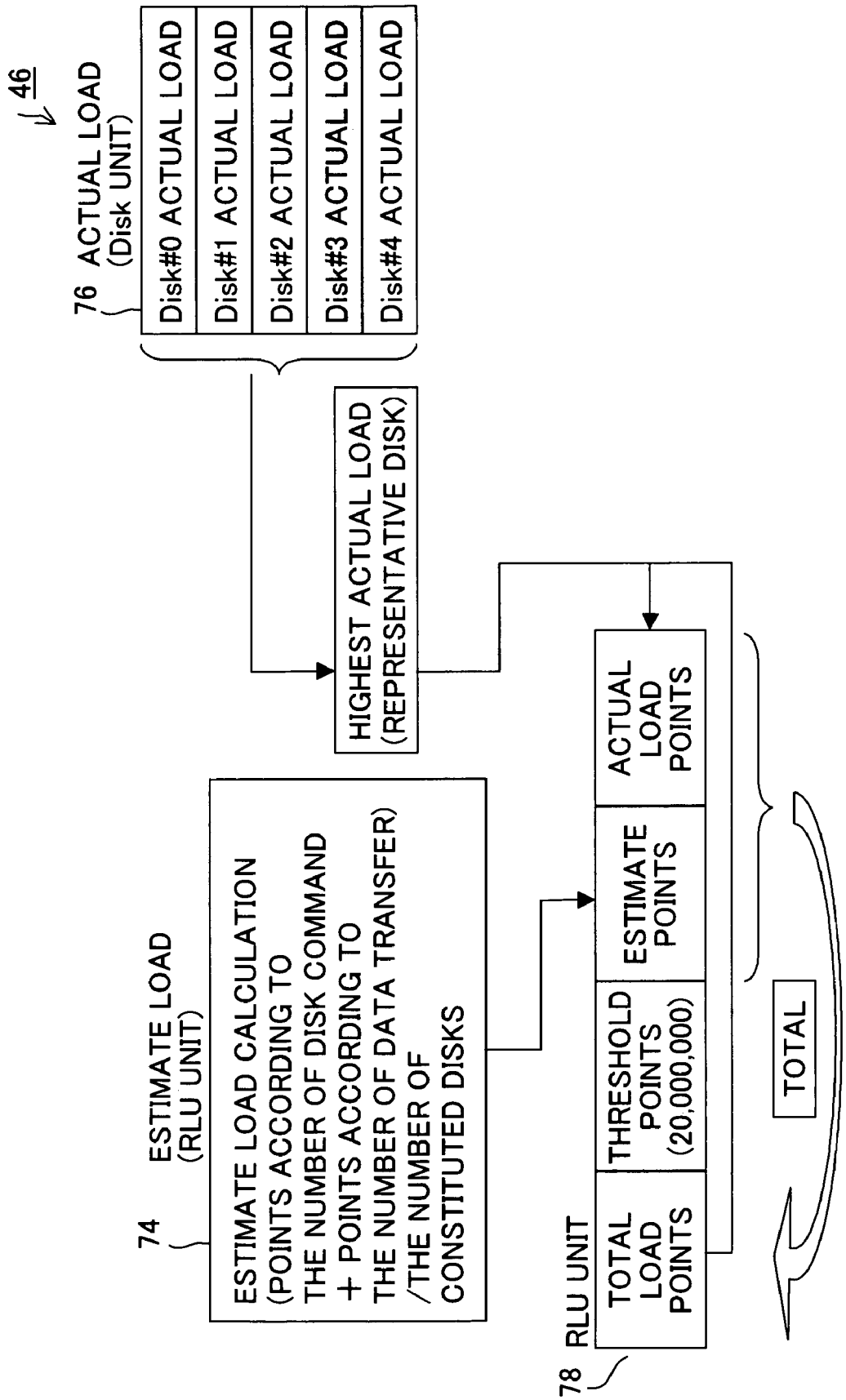
FIG. 7 is a block diagram depicting the system load management section in FIG. 3.
Figures 8, 9:
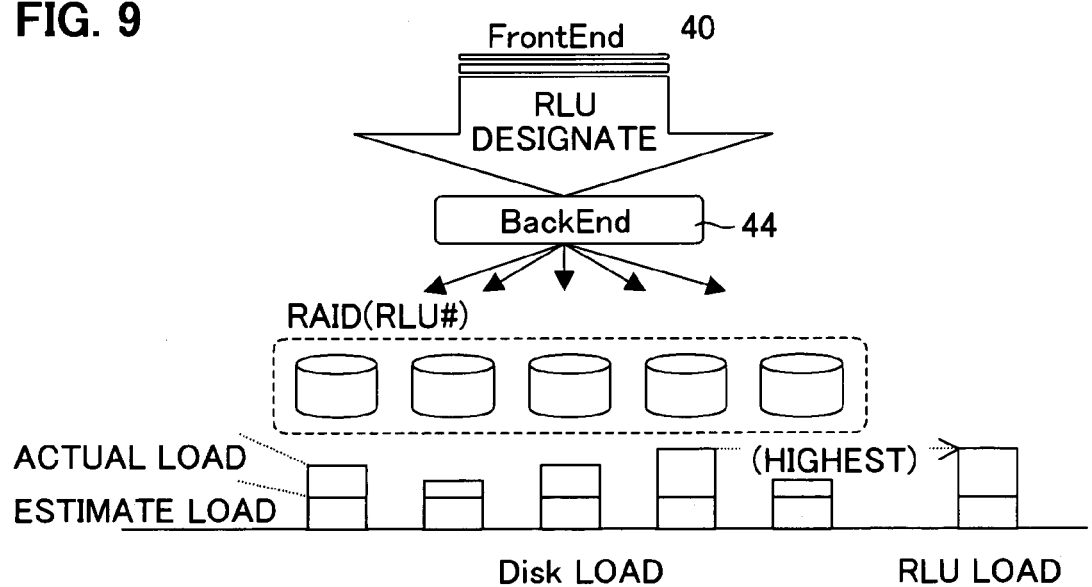
FIG. 8 is a diagram depicting the table of the actual load management section in FIG. 7.
FIG. 9 is a diagram depicting the RLU load in FIG. 7.
Figure 10:
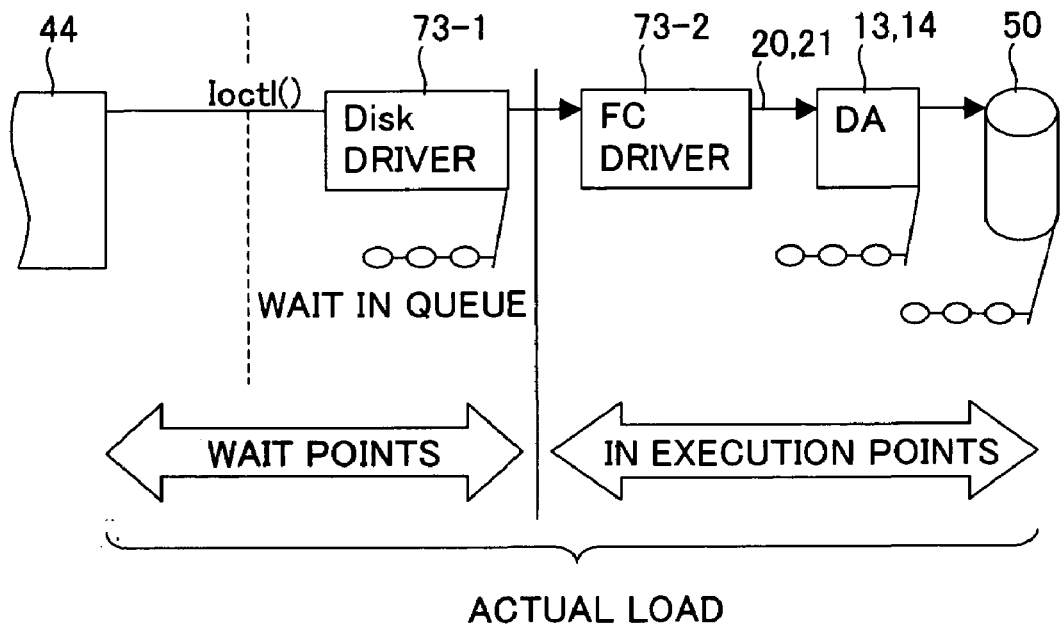
FIG. 10 is a diagram depicting the actual load of the actual load management section in FIG. 7.

Now dynamic system load management using the above mentioned system load management mechanism will be described with concrete examples. FIG. 7 is a diagram depicting the detailed configuration of the system load management module 46 in FIG. 2 and FIG. 3, FIG. 8 is a diagram depicting the configuration of the table of the actual load management module 76 in FIG. 7, FIG. 9 is a diagram depicting the total (system) load in FIG. 7, and FIG. 10 is a diagram depicting the actual load in FIG. 8.

At first, as FIG. 3 and FIG. 7 show, the flow estimate module 74 estimates the load in a stage where the hardware use amount is uncertain, as mentioned above. In this estimate, the individual I/O request uses a disk device at a different position and a different FC_AL loop depending on the requested transfer length, RAID type and command type, and also occupies the hardware for a different-length of time.

Therefore in order to accurately determine the load in RLU (Raid Logical Unit) units, which is the access unit of the host, the statistics are compiled on information on how long each I/O request uses each hardware in hardware resource units (individual disk device/fiber channel unit), and the load rate in RLU units must be determined based on the statistical value of the hardware resource constituting each RLU.

However, the information on how much each I/O request uses each hardware cannot be defined when the request is accepted, and can be judged only when the content of the request is interpreted, each resource for control is acquired, and the commands are separated for each hardware (disk device). In other words, this information is known just before the command is activated to the disk driver in FIG. 3.

Estimated load is estimated in a stage when the hardware use amount is uncertain (see FIG. 3), that is from the time when the I/O request is accepted to the time when the command is activated to the disk driver 73, so statistics are compiled using a method for estimating the hardware use amount from such parameters as the required transfer length, RAID type and command type.

This estimated value is changed into the actual hardware use amount by the actual load management module 76 when the actual hardware use amount, before activating the command to the disk driver 73, is defined, and is reflected in the statistics.

The statistics of the estimated value of this flow estimate module 74 are in RLU units. In other words, if only one command activated by an RLU is considered, as shown in FIG. 9, only a part of the disk devices constituting the RLU is activated, so accesses in the RLU are uneven. However RAID, which use the striping method, have been improved in performance by preventing the concentration of access to a specific disk device by distributing the loads. Therefore as the load of the back end increases by a plurality of commands activated from the front end module 40, the load of each disk device constituting the RLU is more distributed and equalized.

Therefore the flow estimate module, 74 compiles statistics in RLU units which have some errors when the load is low, but which does not require complicated processing, instead of compiling statistics of an individual disk device, so the processing speed increases. When statistics are compiled in RLU units, the load of an individual disk device is determined by dividing the value by the number of disk devices constituting the RAID (RLU).

The flow estimate module 74 uses a point system in RLU units, determines the estimate values of the number of disk commands and the number of times of data transfer, which are load elements, based on the parameters activated from the front end module 40, converts them into time, and compiles statistics regarding 1 µs as 1 point. This will be described with concrete examples.

At first, the estimate value of the hardware use amount based on the number of disk commands is calculated from the average access time of the disk device×number of commands to the disk device. For example, if it is assumed that the average access time of one command to a disk device is 5 ms, then the one command to the disk device is converted into 5 ms=5000 points. The number of commands to a disk device is determined based on the data count activated from the front end module 40.

The estimate value of the hardware use amount based on the number of times of data transfer is calculated by determining the points for one block from the transfer capability of the disk device and the FC_AL in advance, then multiplying these points by the number of transfer blocks. And the estimated load (estimated points) of the I/O requests is calculated as follows in RLU units.

The estimated points=(estimated points based on the number of disk commands+estimated points based on the number of times of data transfer)/(number of disk devices constituting the RLU).

This calculation will be described more concretely with reference to the example of the configuration in the embodiment in FIG. 1. First the transfer capability will be described. The route from the CPU 10 to the disk device 50 in FIG. 1 is the route of the PCI buses 20 and 21, FC_AL 4-1 and the disk device 50. The transfer capability of each route element is the transfer capability.

The logical value of the capability of the PCI bus in FIG. 1 is 528 MB/s, but in actual measurement this is about 200 MB/s. In the configuration in FIG. 1, two PCI buses 20 and 21 are installed for each controller, and five PCI devices, 11, 12, 13, 14 and 30 are connected to each PCI bus. When the capability which one device (DA 13, 14) can use is calculated based on this, then 200 MB/s÷5=40 MB/s.

The capability of the FC_AL at the back end is 200 MB/s, but becomes ½ the performance when both controllers access at the same time, so the capability is 100 MB/s per 1 port of FC. Since the PCI transfer capability becomes the bottleneck of the performance, FC capability is 40 MB/s, which is the same as the PCI capability.

The data transfer capability of a single disk device in FIG. 1 is about 50 MB/s–80 MB/s, but 1–60 units of disk devices 50 are connected to the FC1 port, so the data transfer capability of each disk device is considered to be a capability when the FC capability is divided by the number of disk devices to be connected (which [FC1] is in-charge of).

Therefore the data transfer capability of each disk device is 40 MB/s÷number of disk devices to be connected (which 1 port of FC is in-charge of). For example, when two controllers, 1 and 2, and eight device enclosures, 5-1 to 5-8 (120 disk devices), are in use, the number of disk devices which each port of FC is in-charge of is normally 30 units, so the data transfer capability of each disk device is 1.33 MB/s (=40÷30).

The processing time for one command of the disk device 50 is assumed to be 5 ms, which is the above mentioned average access time. Considering the command processing capability of the disk device 50, performance improves as more commands are activated to the disk device 50, since the disk device 50 has a exchanging function of command line up to improve access speed.

However if too many commands are activated, the overhead of the firmware in the disk device increases, and performance drops. In the measurement of the disk device in FIG. 1, it was discovered that the maximum performance occurred when about 80 commands are activated to the disk device, so the command capability of the disk device 50 is regarded as 80.

In the case of the 2 CM (Controllers)-8 DE (Device Enclosures) model, for example, if it is assumed that each FC port is in-charge of thirty disk devices 50, then 1.33 MB/s, which is the FC capability 40 MB/s divided by 30 units, is the data transfer capability of a single disk device, that is 376 points (376 µs) per one block (=512 Bytes).

The disk command points and the data transfer points are calculated just like actual processing, depending on the parameters (required transfer amount, RAID configuration, command type) at activation. For example, in the case of RAID 5 (3+1, Normal) and 40 kB(kiro-Byte) read commands, the estimated points are calculated as follows.

Disk command points: 80 blocks (40 kB)÷2×5 ms×1=200 ms (200,000 points)

Data transfer points: 80 blocks (40 kB)×376×1=30, 080 points

Total estimated points: 230,080 points (57,520 points per one disk)

Now the actual load management module 76 will be described. One request from the front module 40 to the RLU is converted into a plurality of disk (FC) commands or one disk (FC) command, which are activated to the disk driver 73 (see FIG. 3). At this point, not the estimated hardware use amount but the actual hardware use amount is defined. The actual load management module 76 compiles statistics in each hardware resource unit (in disk device unit), not the statistics in the RLU unit used for estimate, since this information is used as the information for adjustment when the performance of each hardware resource reaches the limit (hardware capability limit point).

Statistics of the actual load management module 76 are compiled by adding points in the disk device unit, as shown in FIG. 7, and the number of times of data transfer activated to the disk driver 73-1 is converted into time, and 1 μs is regarded as 1 point to compile statistics, just like the case of the flow estimate module 74.

In concrete terms, one command to the disk device 50 is regarded as 5 ms (average access time), which is 5000 points. Just like the flow estimate module 74, the points of one block are determined in advance from the transfer capability of the disk/FC, and points are added based on this. The points for one block are 376 points, as mentioned above. And just like the above mentioned estimate, the disk command points and the data transfer points are determined in the disk device unit, and these are added to calculate the actual load points.

If I/O requests exceeding the hardware capability limit point are requested to the hardware, a time out occurs to the disk device, so the actual load management module 76 manages an individual I/O request activated from the back end module 44 so that the target disk device load does not exceed the hardware capability.

As FIG. 10 shows, the actual load management module 76 checks whether the load exceeds the hardware capability, and if the load is less than the hardware capability, the hardware is started up, and if the load exceeds the hardware capability, the actual load management module 76 executes queuing to wait for the load to subside in the disk driver 73-1. Then when the load becomes less than the hardware capability in the extension of the end interrupt from the disk device 50, the I/O requests in the queue are activated up to the limit of the hardware capability.

The actual load management module 76 judges the limit of the hardware capability by managing the amount for each one of the following two elements in the disk device unit, as shown in FIG. 8, and checks the respective threshold to judge whether the limit of the hardware capability is exceeded.

As FIG. 8 shows, the table 76-1 in each disk device manages the disk driver using the actual load points, that is the hardware limit capability points (=FC performance (40 MB/s)÷number of disk devices×4 seconds), total points of the actual load, points in execution (load points after the FC driver 73-2 is activated in FIG. 10), points in a queue (load points in a queue after the disk driver 73-1 is activated and before the FC driver 73-2 is activated in FIG. 10), and manages the number of commands of the disk device using the limit number of commands (80 commands), total number of commands, number of commands in execution (number of command points after the FC driver 73-2 is activated in FIG. 10), and number of commands in a queue (number of command points in a queue after the disk driver 73-1, is activated and before the FC driver 73-2 is activated in FIG. 10).

In other words, when a disk command is issued from the back end module 44 to the disk driver 73-1, the actual load management module 76 calculates the above mentioned number of command points and the number of times of data transfer points, and then calculates the actual load points. And the actual load management module 76 updates the points in queue and the total points in the table 76-1. As FIG. 10 shows, when a disk command is activated from the disk driver 73-1 to the FC driver 73-2, the points in queue is transferred to the points in-execution in the table 76-1.

Then returning to FIG. 7, the load statistic module 78, which integrates the estimated load and the actual load, will be described. The load statistic module 78 manages the integration of the estimated load and the actual load in the RLU unit since a load check is performed in the RLU unit, and managing the integration-in the RLU unit-decreases processing at the load check.

As FIG. 7 and FIG. 9 show, for the statistics of the load statistic module 78, the disk device which load is the highest among the disk devices belonging to the RLU is managed as the representative. If the load in the disk devices belonging to the RLU changes and the number of the disk device which has the highest load is changed, the representative disk device is always switched to the disk device which has the highest load.

The load statistic module 78 adds the estimated load points and the actual load points to calculate the total load points, as shown in FIG. 7. The timing to calculate the total load points can be each time the estimated load or the actual load is updated (that is, each time an internal I/O is processed). However, if the total load points are calculated at each update, processing becomes heavy, so it is preferable to calculate the total load points at the following timings.

(1) When the estimated load points in the RLU unit fluctuate beyond 500,000 points, (2) when the representative disk device (disk device of which the load is highest) of the actual load is replaced (when a value of each disk device reaches beyond 100,000 points, the points are compared with the points of the representative disk device, and if the points are higher than the points of the representative, that disk device is replaced with the conventional disk device), (3) when the value of the representative disk device of the actual load fluctuates beyond the 100,000 point boundary.

For the threshold point of the load statistic module 78 in FIG. 7, the system capability limit point is set. For example, a value of 20,000,000 points, determined from 20 seconds (20,000,000 μs), which is a timer value of communication between controllers, is set.

The load statistic module 78 can determine the ratio (%) of the load. The ratio of the load is calculated by (total load points÷threshold point×100).

[Dynamic System Load Control]

Figure 11:
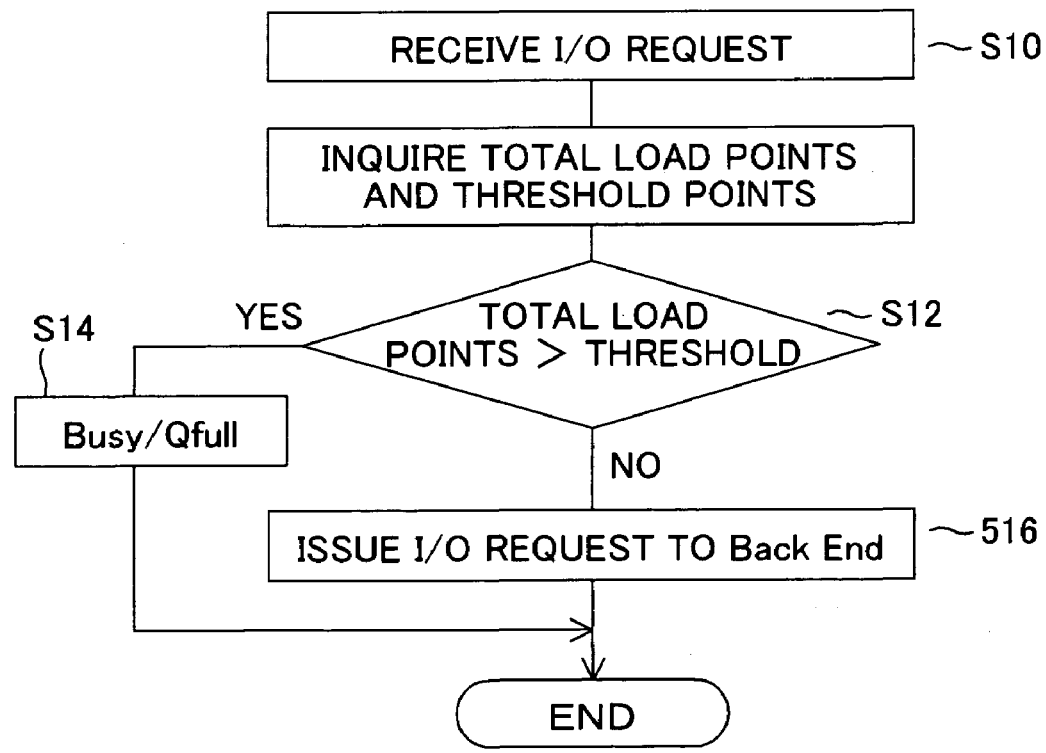
FIG. 11 is a flow chart depicting the processing of the H-IO control section in FIG. 4.
Figure 12:
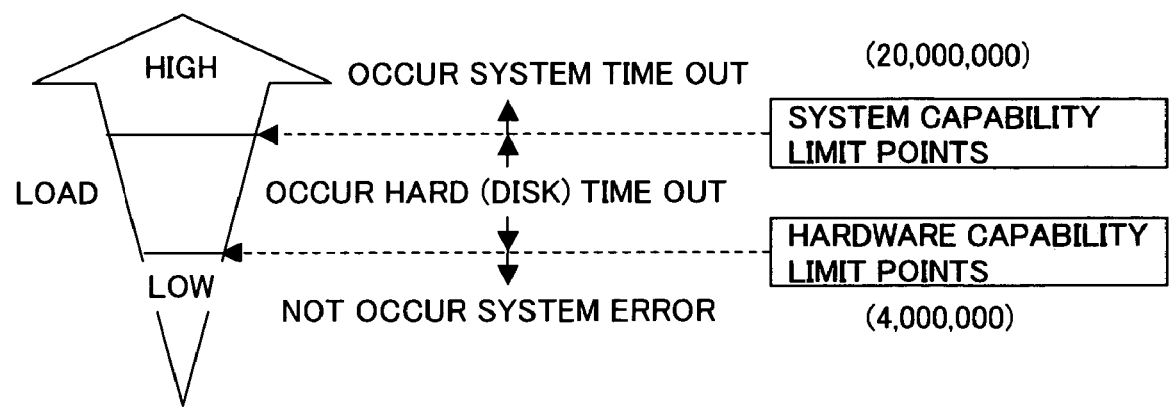
FIG. 12 is a diagram depicting the capability limit point in FIG. 7.
Figure 13:
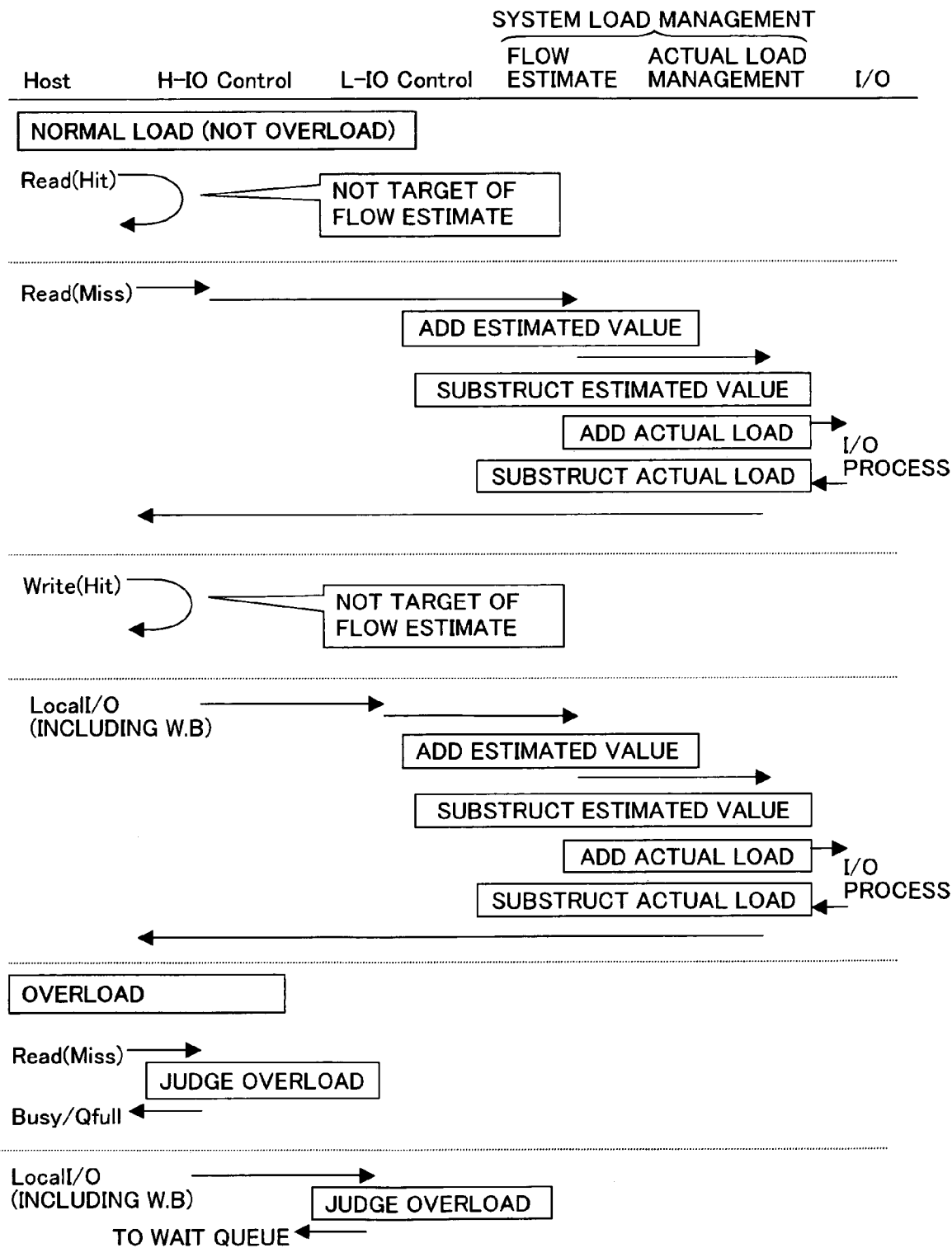
FIG. 13 is a diagram depicting the processing flow of the IO control section and the system load management section in FIG. 3.
Figure 14:
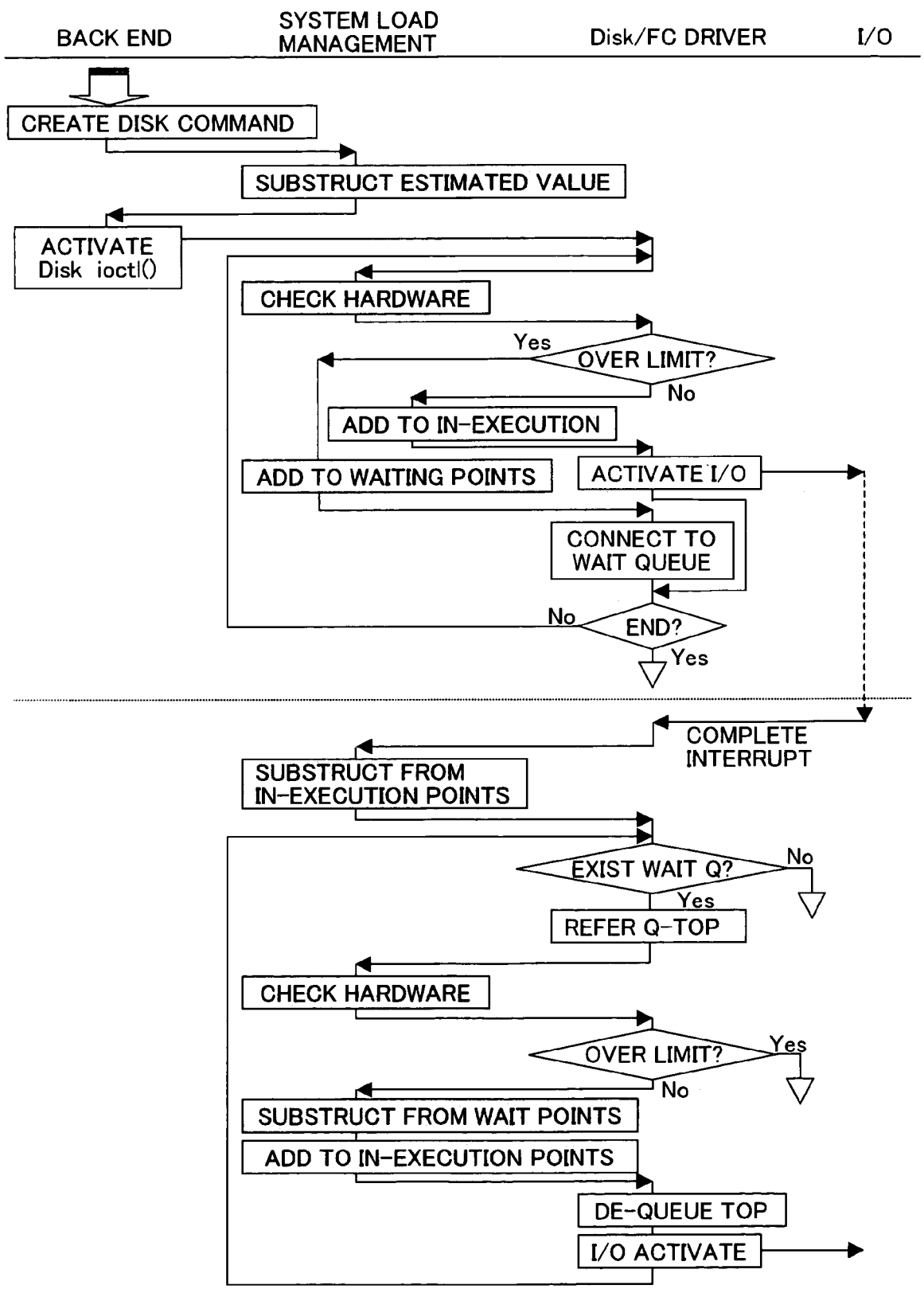
FIG. 14 is a diagram depicting the processing flow of the system load management section and the back end module in FIG. 3.

FIG. 11 is a flow chart depicting the host I/O processing of the H-IO control module 60 in FIG. 3, FIG. 12 is a diagram depicting the hardware capability limit point and the system capability limit point which were described in FIG. 7 and FIG. 8, FIG. 13 is a diagram depicting the processing flow of the H-IO control module 60 and the system load management module 46 in FIG. 11, and FIG. 14 is a diagram depicting the processing flow of the IO control module 42 and the system load management module 46.

As FIG. 12 shows, as the system load becomes high, the following two limit points appear. One is the hardware capability limit point. In other words, this is a boundary point where requesting more processing to hardware exceeds the processing capability of hardware, and processing does not complete within a predetermined time. For example, if the capability of the disk device is 10 MB/s and the monitoring time of the hardware processing is 5 seconds, then a hardware time out occurs if request exceeds 50 MB. When the requests reach the hardware capability limit point, the requests which overflow are queued in the above mentioned driver 73.

For example, if the time monitoring of the disk device is 7 seconds, and of this 3 seconds are for replacing of line up command and positioning in the disk device and the remaining 4 seconds are for data transfer, the hardware capability limit point is determined from the 4 seconds (4,000,000 µs), that is 4,000,000 points.

The other is the system capability limit point. If requests continuously come exceeding the limit of the hardware capability, queuing starts in the driver 73, and processing does not complete within the system monitoring time (command time out detected in CA 11 or 12 (25 seconds), or within time out (20 seconds) between controllers), and this boundary point is called the system capability limit point. When the system capability limit point is reached, the host requests which of the overflow are responded to, with the above mentioned Busy/Q-Full. In the case of a local I/O, requests are queued until the load subsides below the limit point.

For example, if the time monitoring of the host command processing performed in the front module 40 is 25 seconds and the time monitoring of communication between controllers at a cross-access between controllers is 20 seconds, the system capability limit point is determined from the shorter one, 20 seconds (20,000,000 µs), that is 20,000,000 points.

Now the system load control will be described with reference to the processing flow chart of the I/O control module 42 in FIG. 11, and the process flow chart of the I/O control module 42 and system load management module 46 in FIG. 13.

(S10) When the I/O control module 42 accepts the I/O request, the I/O control module 42 inquires the system load management module 46 about the total load points and the threshold points (see FIG. 7) of the load statistic module 78.

(S12) The I/O control module 42 judges whether the total load points exceeds the threshold points (system capability limit point).

(S14) If the total load points exceed the threshold points, Busy/Q-Full is replied to the host since the system load is high, as described in FIG. 4, FIG. 6 and FIG. 12, and processing ends without activating the I/O request to the back end.

(S16) If the total load points do not exceed the threshold points, the I/O request is issued to the back end module 44 since the system load is not high, as described in FIG. 5, and processing ends.

This will be described concretely with reference to FIG. 13. In the case of a normal load, where load is not an overload, if the read request from the host 3 is judged as a cache hit by the front end module 40, the data of the cache memory 16 is transferred to the host 3 and does not become a target of flow management.

If the read request is a cache miss-hit, the read request is issued to the back end module 44, the estimated load value is calculated by the flow estimate module 74, and is added to the estimated value of the load statistic module 78. The actual load module 76 subtracts the points of the estimated value and adds these points to the actual load points (transfers the subtracted estimated value to the actual load value). When I/O processing in the I/O module ends, the actual load points are subtracted. Along with this, read data is transferred from the disk device to the host.

Also in the case of a normal load which is not an overload, if a write request arrives from the host 3, the write data is written to the cache memory 16 in the front end module 40, and the write request does not become a target of flow management.

The local I/O requests, such as a write back, are transferred to the back end module 44, and the load estimate value thereof is calculated by the flow estimate module 74 and is added to the estimate value of the load statistic module 78. The actual load module 76 subtracts the estimate value and adds this value to the actual load points (the subtracted estimated value is moved to the actual load value). When I/O processing in the I/O module ends, the actual load points are subtracted. Along with this, the write completion is transferred from the disk device to the host.

In the case of an overload, on the other hand, if the read request from the host 3 is judged as a cache hit by the front end module 40, the data of the cache memory 16 is transferred to the host 3 and does not become a target of flow management. But, if the read request is judged as a cache miss-hit, the read request is not issued to the back end module 44, and Busy/Q-Full is replied to the host 3. The local I/O including a write back is also held in the queue in the L-IO control module 61.

Now hardware capability limit control will be described with reference to FIG. 14. When a disk command is created in the back end module 44, the actual load management module 76 refers to the table 76-1 for each disk device, and checks the hardware capability point. In other words, the actual load management module 76 judges whether either the total point or the total number of commands exceeds the limit value, and if not, the actual load management module 76 adds the disk command to the points in execution, or the number of commands in execution in the table 76-1, and activates the I/O.

If the total point or total number of commands exceeds the limit value, the actual load management module 76 adds the disk command to the points in queue or the number of commands in queue in the table 76-1, and holds the disk command in the queue. This is repeated for the number of disk commands to be created, and processing ends.

When the termination interrupt arrives from the activated I/O to the disk/FC driver 73, the actual load management module 76 subtracts the points in execution and the number of commands in execution. The disk/FC driver 73 judges whether there is a command in the queue, and if not processing ends.

If there is a command in the queue, the actual load management module 76 refers to the beginning of the queue, refers to the table 76-1 of each disk device, and checks the hardware capability point. In other words, the actual load management module 76 judges whether either the total points or the total number of commands exceeds the limit value, and if not, the actual load management module 76 subtracts the command from the points in the queue or the number of commands in the queue in the table 76-1, adds this value to the points in execution or the number of commands in execution, de-queues the beginning of the queue, and activates the I/O.

If the total points or total number of commands exceeds the limit value, this routine is exited.

[Threshold Adjustment Processing]

Figure 15:
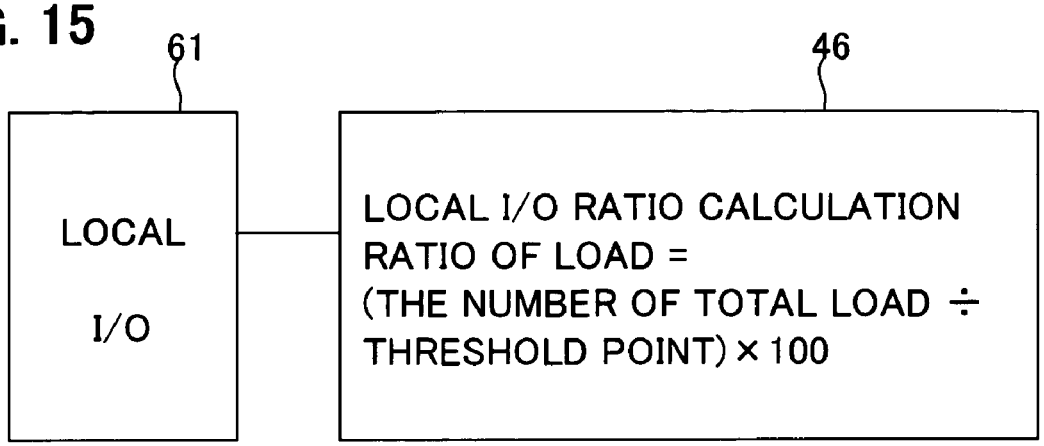
FIG. 15 is a diagram depicting the L-IO control section in FIG. 3.
Figure 16:
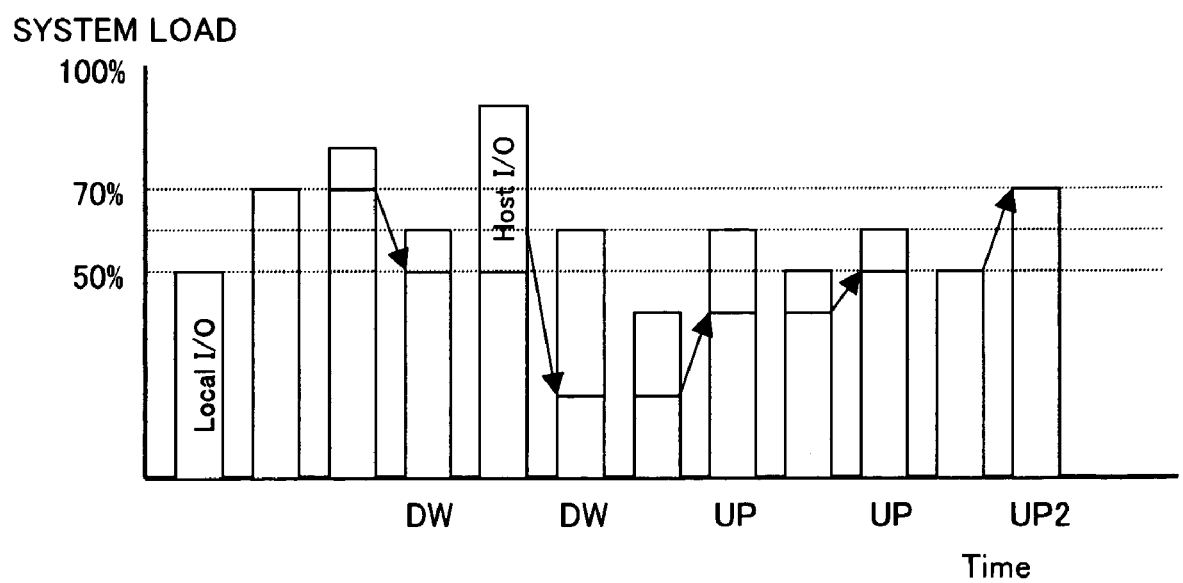
FIG. 16 is a diagram depicting the operation of the threshold control of the local I/O request in FIG. 15.

Now threshold adjustment processing for controlling the ratio of the local I/O will be described. FIG. 15 is a diagram depicting the relationship between the L-IO control module 61 and the system load management-module 46, and FIG. 16 is a diagram depicting the system load and the threshold of the local I/O. Here the threshold of the local I/O is variably controlled.

As FIG. 15 shows, the load statistic (RLU) module 78 calculates the threshold of the local I/O (ratio) from the load ratio(=(total load points÷threshold points)×100). The L-IO control module 61 acquires this threshold of the local I/O and judges whether the current command size for the access target RLU+command size to be issued from now exceeds this threshold.

As a control algorithm of the local I/O, the local I/O is restricted sooner than the host I/O by making differences in the thresholds between the host I/O and the local I/O, since the highest priority is assigned to the host I/O. In other words, when there is a host I/O, the ratio of the local I/O is minimized, but when there is no host I/O, the local I/O is executed as much as possible.

Therefore the L-IO control module 61 restricts the ratio of the local I/O with respect to the entire load, as shown in FIG. 16, sets the ratio to 70% of the threshold at the highest (value which can be set from Web), and if there is a host I/O, the ratio of the local I/O is restricted at the point when the system load exceeds 60% of the threshold.

Even if the ratio of the load of the host I/O is extremely high, the minimum threshold of the local I/O is controlled to be 10%, so that minimum local I/Os are executed. As the entire load subsides, the restriction in ratio of the local I/Os is cancelled, and the ratio is finally returned to the maximum 70% of the threshold.

For the local I/O for which the completion time must be 10 guaranteed, such as OPC, a command is executed at each predetermined time at least, so as to guarantee the transfer performance required to guarantee the time. The timing when the threshold of the local I/O is changed is when a local I/O command is issued and when it is completed.

According to FIG. 16, the symbol DW indicates when there is a host I/O and the ratio of the local I/O is decreased since the system load exceeded 60%. The symbol UP indicates when the ratio of the local I/O is increased (up to 60%) since the system load became 50% or less. The symbol UP2 indicates when the ratio of the local I/O is returned to 70% since a host I/O load does not exist.

The L-IO control module 61 in FIG. 3 and FIG. 15 controls priority in the queue. In other words, there are three types of priority in a queue, and in any queue where the queuing of commands exist, a command with higher priority is executed first.

The following are the three types of queues.

The queue with the highest priority (with guaranteeing time) has two types of modes (time priority setting, host I/O priority) which can be set from CGI, and in the case of time priority, the command is issued to the back end module at every predetermined time without waiting for a command completion notice. As a result, an increase in the system load is a concern, but in this case, the host I/O is restricted so as to guarantee time. The target I/O is OPC.

The queue with the next highest priority (without time guarantee) is executed before a queue with the lowest priority, but time is not guaranteed, and the host I/O has the higher priority. The target I/O is Rebuild/Copy-back, LDE (Logical Device Expansion) and Migration.

The queue with the lowest priority is a queue which is not executed when a queue with a higher priority exists, and the target I/O is Quick Format.

Figure 17:
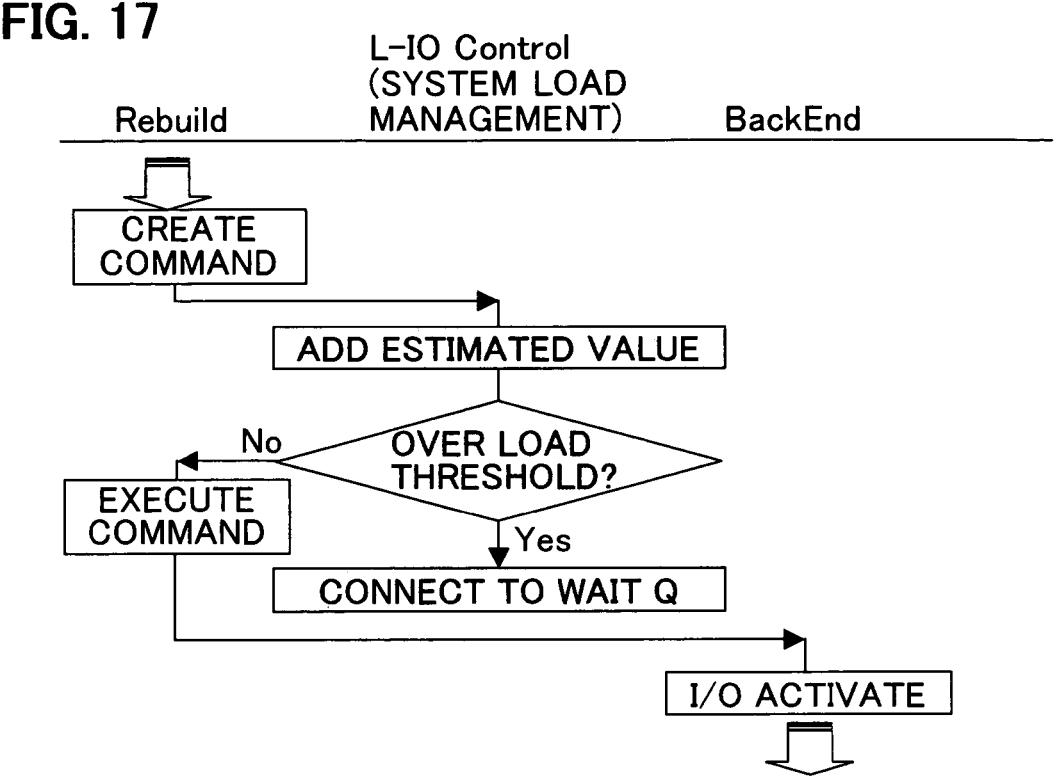
FIG. 17 is a diagram depicting the processing flow of the L-IO control section and the system load management section in FIG. 3.
Figure 18:
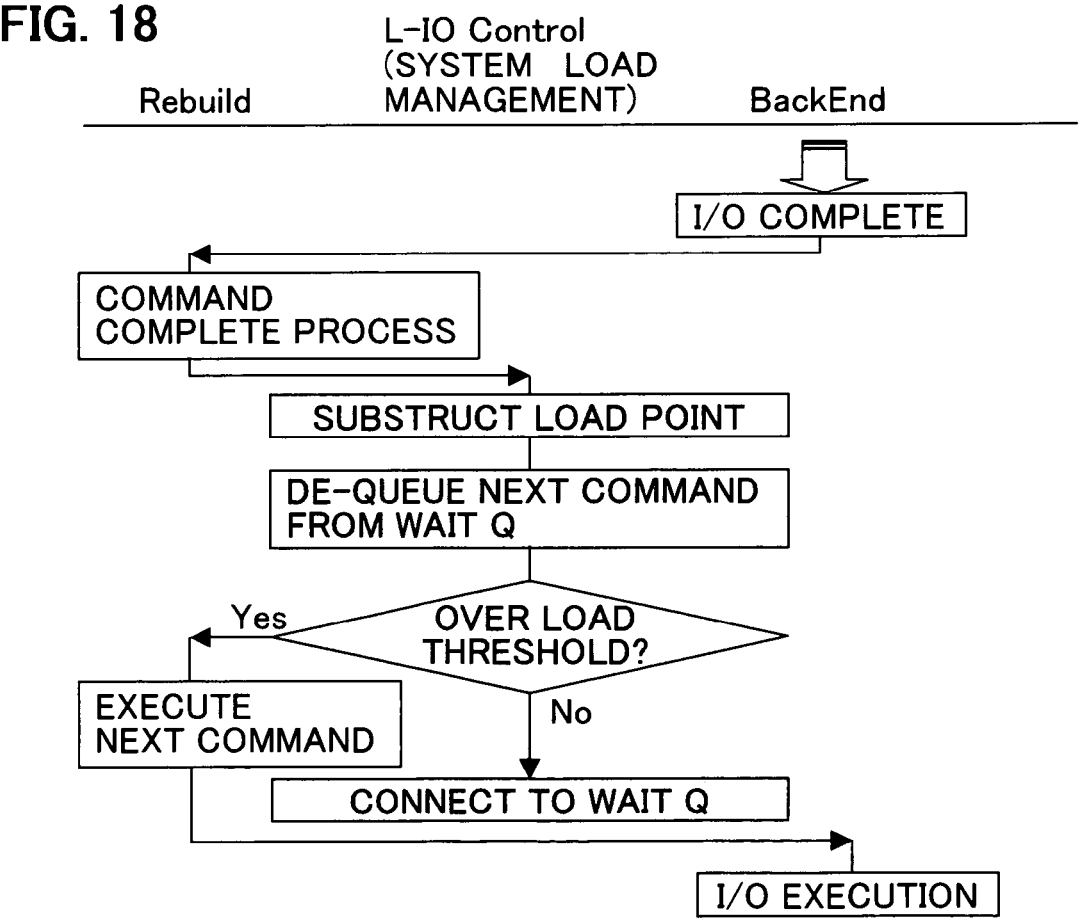
FIG. 18 is a diagram depicting the processing flow of the L-IO control section and the system load management section in FIG. 3.
Figure 19:
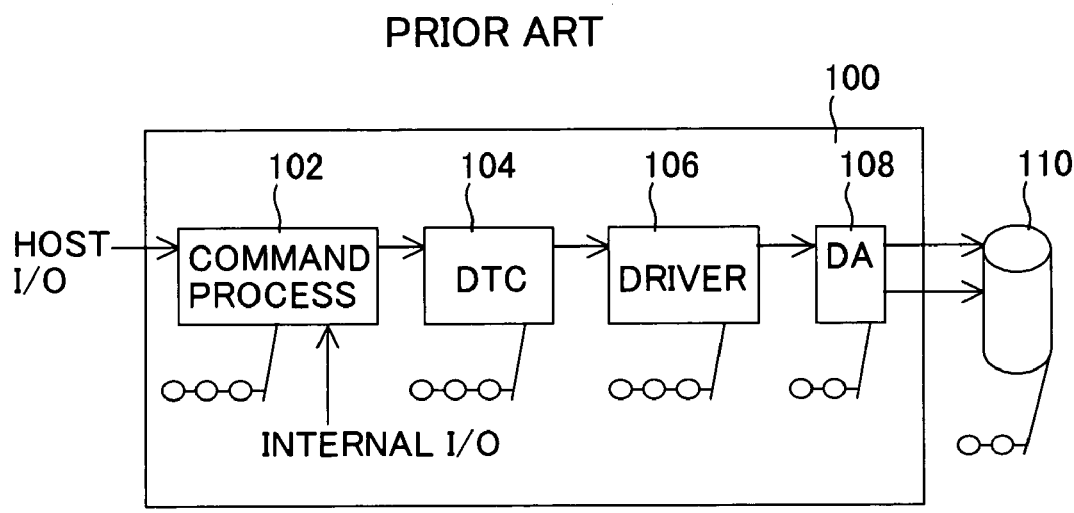
FIG. 19 is a block diagram depicting a prior art.
Figure 20:
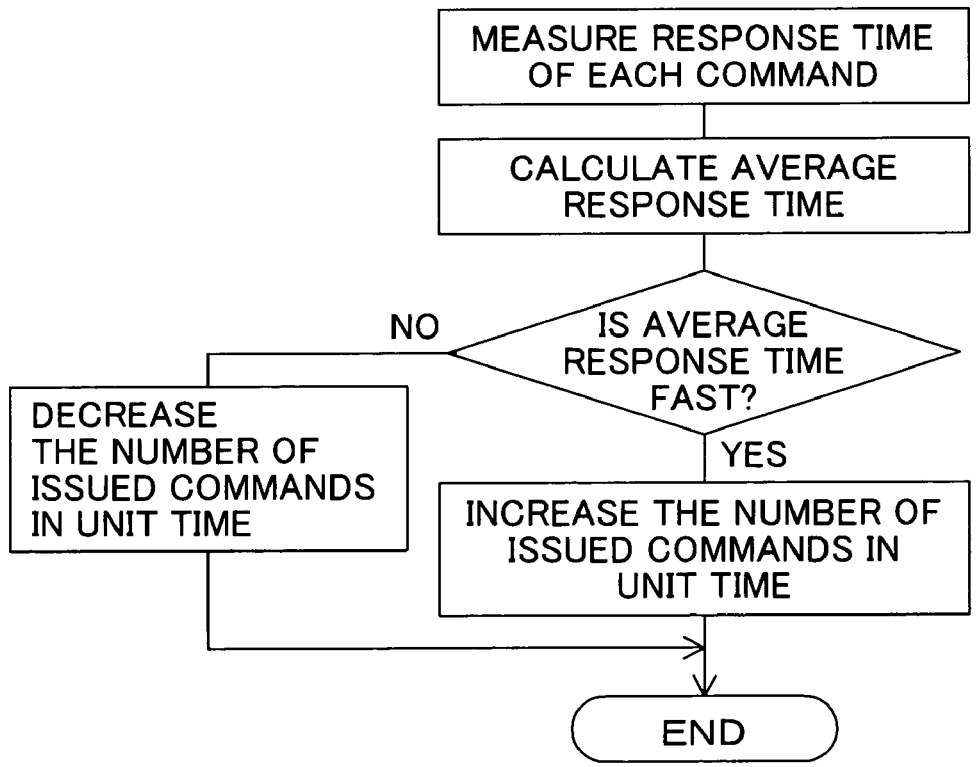
FIG. 20 is a diagram depicting the processing flow of the DTC of prior art.

Now local I/O processing when the L-IO control module 61 manages threshold by itself will be described. FIG. 17 and FIG. 18 are diagrams depicting the processing flow of the L-IO control module 61. As mentioned above, the L-IO control module 61 is a module for adjusting the activation amount of the local I/O, judges the load status of the system load management module 46, and adjusts the activation amount when the local I/O is accepted. The activation amount is adjusted by queuing.

In FIG. 17, processing is described using Rebuild for the local I/O. When the local I/O is executed, the L-IO control module 61 is called up to check whether a command can be issued before Extent exclusion.

As FIG. 17 shows, when the local I/O command is created in Rebuild 87, an inquiry is sent to the L-IO control module 61. The L-IO control module 61 requests the flow estimate module 74 of the system load management module 46 to calculate the estimated value, and to add this to the estimated value of the load statistic module 78.

The L-IO control module 61 judges whether the estimate value exceeds the above mentioned threshold of the local I/O execution in FIG. 15, and if it does exceed, the command issued to the L-IO control module 61 is queued in the L-IO control module 61. If it does not exceed the threshold of the local I/O execution, command execution is instructed to the Rebuild 87, and the Rebuild 87 activates the I/O to the back end module 44.

As FIG. 18 shows, when the I/O completes by the command to the back end module 44, the completion is notified to the Rebuild 87. By this, the system load management module 46 subtracts the actual load value.

And the L-IO control module 61 removes the next command from the queue, judges whether the above mentioned threshold of the local I/O execution in FIG. 15 is exceeded, and if exceeded, the command issued to the L-IO control module 61 is queued in the L-IO control module 61. If the threshold of the local I/O execution is not exceeded, on the other hand, the L-IO control module 61 instructs the Rebuild 87 to execute the command, and the Rebuild 87 activates the I/O to the back end module 44.

In this way, the L-IO control module 61 adjusts the issue of the local I/O within the threshold of local I/O execution, and when the load of the back end subsides to the threshold or less, which is a state where the local I/O can be executed, the next stage (command) is called up. By this, for the local I/O as well, Extent exclusion acquisition processing 72 and command issue processing to the back end module 44 shown in FIG. 3 are continued.

For the local I/O which is required to execute the host I/O, the H-IO control module 60 is used, just like the case of the host I/O. At this time, if the command required to execute the host I/O has already been queued in the L-IO control module 61, then-the host I/O can be executed immediately.

[Other Embodiments]

The above mentioned embodiment was described using a RAID with the redundant configuration shown in FIG. 1, but the present invention can be applied to a storage system with other redundant configurations. For the physical disk, a magnetic disk, optical disk, magneto-optical disk and various types of storage devices can be applied.

As the system load, the command processing amount is managed by both the estimated value and the actual load value, but only the estimated value can be used as the system load.

The present invention was described using embodiments, but the present invention can be modified in various ways within the scope of the essential character of the present invention, and these shall not be excluded from the scope of the present invention.

In this way, according to the present invention, the host I/O requests, which were not managed in the conventional storage system, are managed according to the system load of the storage system, and for the host I/O request which exceeds the system load, the host I/O request is not processed, instead an error is replied so that the host retries the command. By this, the stagnation of the command processing within the system can be suppressed.

Also the system load is calculated by both loads before and after access execution, so the load of the system itself can be accurately managed.

What is claimed is:

1. A storage system for accessing a connected storage device according to an I/O request requested from a host and executing the I/O request, comprising:
   a command processing section for executing command processing according to said I/O request and outputting a result of the command processing; and
   an access execution section for accessing said storage device according to said result of the command processing,
   wherein said command processing section estimates a load of said I/O request on said access execution section, calculates an actual load on said access execution section, calculates a system load from said estimated load and said actual load, and inhibits an acceptance of the I/O request requested from said host when said system load exceeds a predetermined threshold.

2. The storage system according to claim 1, wherein said command processing section adjusts said host I/O request and an internal I/O request according to said system load, analyzes the adjusted I/O requests, executes resource acquisition processing, and activates said access execution section.

3. The storage system according to claim 2, wherein said command processing section comprises:
   a first I/O control module for adjusting said host I/O request; and
   a second I/O control module for adjusting said internal I/O request, and
   wherein said command processing section, when said system load exceeds a predetermined threshold, inhibits the acceptance of the I/O request requested from said host and holds said internal I/O request in a queue.

4. The storage system according to claim 1, wherein said command processing section estimates the processing time of the access execution section including said storage device from the parameters of said I/O request so as to acquire said estimated load, and also calculates the processing time of the access execution section including said storage device from said command processing result so as to acquire said actual load.

5. The storage system according to claim 1, wherein said command processing section prioritizes said host I/O request and controls a ratio of internal I/O processing with respect to said system load based on said system load.

6. The storage system according to claim 1, wherein said command processing section controls a command processing amount of said access execution section according to said actual load.

7. The storage system according to claim 1, wherein said command processing section estimates said load from a unit processing time of said access execution section which is defined by the hardware and a number of said I/O requests which are processed.

8. The storage system according to claim 1, further comprising a cache memory for storing a part of the data of said storage device,
   wherein said command processing section refers to the cache memory when said host I/O request is received, and inhibits the acceptance of the I/O request requested from said host for the host I/O which cannot be processed by said cache memory, when the system load exceeds a predetermined threshold.

9. The storage system according to claim 8, wherein said command processing section comprises:
   a front module for referring to the cache memory and processing said host I/O request by said cache memory;
   an IO control module for inhibiting the acceptance of said host I/O request when said system load exceeds a predetermined threshold for the host I/O and internal I/O which cannot be processed by said cache memory; and
   a back end module for analyzing the I/O request inhibited by said IO control module and acquiring resource.

10. The storage system according to claim 1, wherein said command processing section comprises:
    a flow estimate module for estimating the load of said requested I/O request on said access execution section;
    an actual load management module for managing the actual load of said access execution section; and
    a load statistic module for calculating the system load from said estimated load and said actual load.

11. A dynamic system load management method for a storage system for accessing a connected storage device according to an I/O request requested from a host and executing the I/O request, comprising:
    a command processing step of executing command processing according to said I/O request;
    an access execution step of accessing said storage device according to a result of executing said command processing step;
    a system load calculation step of estimating the load of said access execution step of said requested I/O request, calculating the actual load of said access execution step, and calculating the system load from said estimated load and said actual load; and
    a step of inhibiting the acceptance of the I/O request requested from said host when said system load exceeds a predetermined threshold.

12. The dynamic system load management method according to claim 11, wherein said command processing step comprises:

a step of adjusting said host I/O request and internal I/O request according to said system load; and a step of analyzing the adjusted I/O request, executing resource acquisition processing and activating said access execution step.

13. The dynamic system load management method according to claim 12, wherein said command processing step comprises:

a first I/O control step of adjusting said host I/O request; and a second I/O control step of adjusting said internal I/O request, and wherein said command processing step, when said system load exceeds a predetermined threshold, inhibits the acceptance of the I/O request requested from said host, and holds said internal I/O request in a queue.

14. The dynamic system load management method according to claim 11, wherein said system load calculation step comprises:

a step of estimating the processing time of the access execution section including said storage device from the parameters of said I/O request so as to acquire said estimated load;

a step of calculating the processing time of the access execution section including said storage device from said command processing result so as to acquire said actual load.

15. The dynamic system load management method according to claim 11, wherein said command processing step further comprises a step of prioritizing said host I/O request and controlling a ratio of internal I/O processing with respect to said system load based on said system load.

16. The dynamic system load management method according to claim 11, wherein said command processing step comprises a step of controlling a command processing amount of said access execution step according to said actual load.

17. The dynamic system load management method according to claim 11, wherein said system load calculation step comprises a step of estimating said load from a unit processing time of said access execution step which is executed by the hardware, and a number of said I/O requests which are processed.

18. The dynamic system load management method according to claim 11, wherein said command processing step further comprises a step of referring to the cache memory for storing a part of the data of said storage device when said I/O request is received, and wherein said inhibiting step comprises a step of inhibiting the acceptance of the I/O request requested from said host for the host I/O which cannot be processed by said cache memory, when said system load exceeds a predetermined threshold.

19. The dynamic system management method according to claim 18, wherein said command processing step comprises:

a front processing step of referring to the cache memory and processing said host I/O request by said cache memory;

an IO control step of inhibiting the acceptance of said host I/O request when said system load exceeds a predetermined threshold for the host I/O and internal I/O which cannot be processed by said cache memory; and a back end step of analyzing the I/O request adjusted in said IO control step and acquiring resource.

20. The dynamic system load management method according to claim 11, wherein said system load calculation step comprises:

a flow estimate step of estimating the load of said requested I/O request in said access execution step;

an actual load management step of managing the actual load in said access execution step; and a load statistic step of calculating the system load from said estimated load and said actual load.

* * * * *